United States Patent [19]

Woolley

[11] Patent Number: 4,959,800
[45] Date of Patent: Sep. 25, 1990

[54] METHOD AND APPARATUS FOR DETERMINING THE POSITION AND VELOCITY OF A TARGET IN INERTIAL SPACE

[75] Inventor: Richard L. Woolley, Canoga Park, Calif.

[73] Assignee: Hughes Aircraft Company, Los Angeles, Calif.

[21] Appl. No.: 197,015

[22] Filed: May 20, 1988

[51] Int. Cl.[5] .............................................. G01S 13/06
[52] U.S. Cl. .................................. 364/516; 235/411; 235/412; 235/413
[58] Field of Search ................ 364/516; 235/411, 412, 235/413, 414, 415, 416; 342/104–106, 109, 113, 114

[56] References Cited

U.S. PATENT DOCUMENTS

| | | | |
|---|---|---|---|
| 3,304,409 | 2/1967 | Snowden et al. | 364/458 |
| 3,982,246 | 9/1976 | Lubar | 364/458 |
| 4,148,026 | 4/1979 | Gendreu | 235/411 |
| 4,156,875 | 5/1979 | Keane et al. | 235/411 |
| 4,179,696 | 12/1979 | Quesinberry et al. | 342/75 |
| 4,760,397 | 7/1988 | Piccolruaz | 342/75 |
| 4,825,055 | 4/1989 | Pollock | 234/411 |

OTHER PUBLICATIONS

IEEE Transactions on Aerospace & Electronic Systems, vol. AES-17, No. 2, Mar. 1981, "Estimation of Aircraft Target Motion Using Orientation Measurements", pp. 254–260, J. D. Kendrick et al.
Proceedings of the 1988 IEEE National Radar Conference, Apr. 20–21, 1988, Ann Arbor, Michigan, "Target Tracking in Maneuver Centered Coordinates", pp. 68–73, J. A. Roecker, et al.
IEEE Transactions on Aerospace & Electronic Systems, vol. AES-14, No. 1, Jan. 1978, "Adaptive Tracking Filter for Maneuvering Targets", pp. 185–193, G. G. Ricker et al.

Primary Examiner—Thomas G. Black
Attorney, Agent, or Firm—R. A. Hays; R. M. Heald; W. Denson-Low

[57] ABSTRACT

A method for determining the position and velocity of a target in inertial space including the steps of (a) tracking the target and providing three orthogonal velocity components in inertial space; (b) computing the scalar velocity $V_T$ of the target in an inertial reference frame by providing the square root of the sum of the squares of the orthogonal velocity components; and (c) computing the aspect angle $\beta_{cue}$ of the target relative to a line-of-sight to a platform as an inverse sinusoidal function of the ratio of one of said orthogonal components and $V_T$, when such tracking data is available, and otherwise; (d) estimating actual target maneuver to develop a minimum uncertainty zone using an assumed worst case lateral target acceleration. Also disclosed are techniques for bounding the aspect angle and for providing global range and range rate estimates which account for uncertainties in the measurements of target and platform ranges and velocities.

10 Claims, 10 Drawing Sheets

METHOD AND APPARATUS FOR DETERMINING THE POSITION AND VELOCITY OF A TARGET IN INERTIAL SPACE

GOVERNMENT RIGHTS PROVISION

This invention was made with U.S. Government support under contract No. F0835-82-C-0001 awarded by the Department of the Air Force. The U.S. Government therefore has certain rights in this invention.

BACKGROUND OF THE INVENTION

1. Field of the Invention

This invention relates to tracking and guidance systems. More specifically, the present invention relates data processing systems and techniques for radar tracking systems and the like.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof.

2. Description of the Related Art

For a tracking system to maintain an accurate track file on a target, the system must receive data at regular intervals relating to the target's position and movement. Unfortunately, for a number of reasons, such information may not always be available on a continuous basis. When the flow of tracking data is intermittent or otherwise interrupted, conventional tracking systems have not been able to measure all the parameters necessary to determine a target cue (range, range rate, and aspect angle, for example) and therefore have heretofore simply operated on the basis that the target must be within some "uncertainty zone". This problem becomes particularly acute when such data is unavailable for extended periods of time.

Conventional systems typically assume a worst case target maneuver which results in excessively large uncertainty zones. This, leads to data losses and excessively long target search times. This, in turn, compounds target discrimination and association problems with obviously undesirable consequences for commercial and military applications. Further, multi-parameter searches, (i.e., for range, range rate, and possibly angle) for initial target acquisition and minimum system complexity, dictate that the uncertainty bounds be minimized within the constraints of possible target maneuver.

There is therefore a need in the art for a system and technique for minimizing the uncertainty zone resulting from an interruption in the availability of target tracking data.

SUMMARY OF THE INVENTION

The improved technique of the present invention for determining the position and velocity of a target in inertial space substantially addresses the need in the art. The invention utilizes any combination of range, range rate, and angle measurements to estimate actual target maneuver and its effect on parameters which are not available to develop a minimum uncertainty zone, rather than assuming a worst case unknown target maneuver. That is, target data is used to estimate target aspect. Since the primary producer of uncertainty is target lateral acceleration, the knowledge of target aspect during track allows the unknown target acceleration to be applied to the actual track geometry rather than an arbitrary, unknown condition. Hence, the present invention provides for greater ease and accuracy in target tracking.

The method of the invention includes the steps of (a) tracking the target and providing three orthogonal velocity components in inertial space; (b) computing the scalar velocity $V_T$ of the target in an inertial reference frame by providing the square root of the sum of the squares of the orthogonal velocity components; and (c) computing the aspect angle $\beta_{cue}$ of the target relative to a line-of-sight to a platform as an inverse sinusoidal function of the ratio of one of said orthogonal components and $V_T$, when such tracking data is available, and otherwise; (d) estimating actual target maneuver to develop a minimum uncertainty zone using an assumed worst case lateral target acceleration. Also disclosed are techniques for bounding the aspect angle and for providing global range and range rate estimates which account for uncertainties in the measurements of target and platform ranges and velocities.

DESCRIPTION OF THE INVENTION

Figure 1:
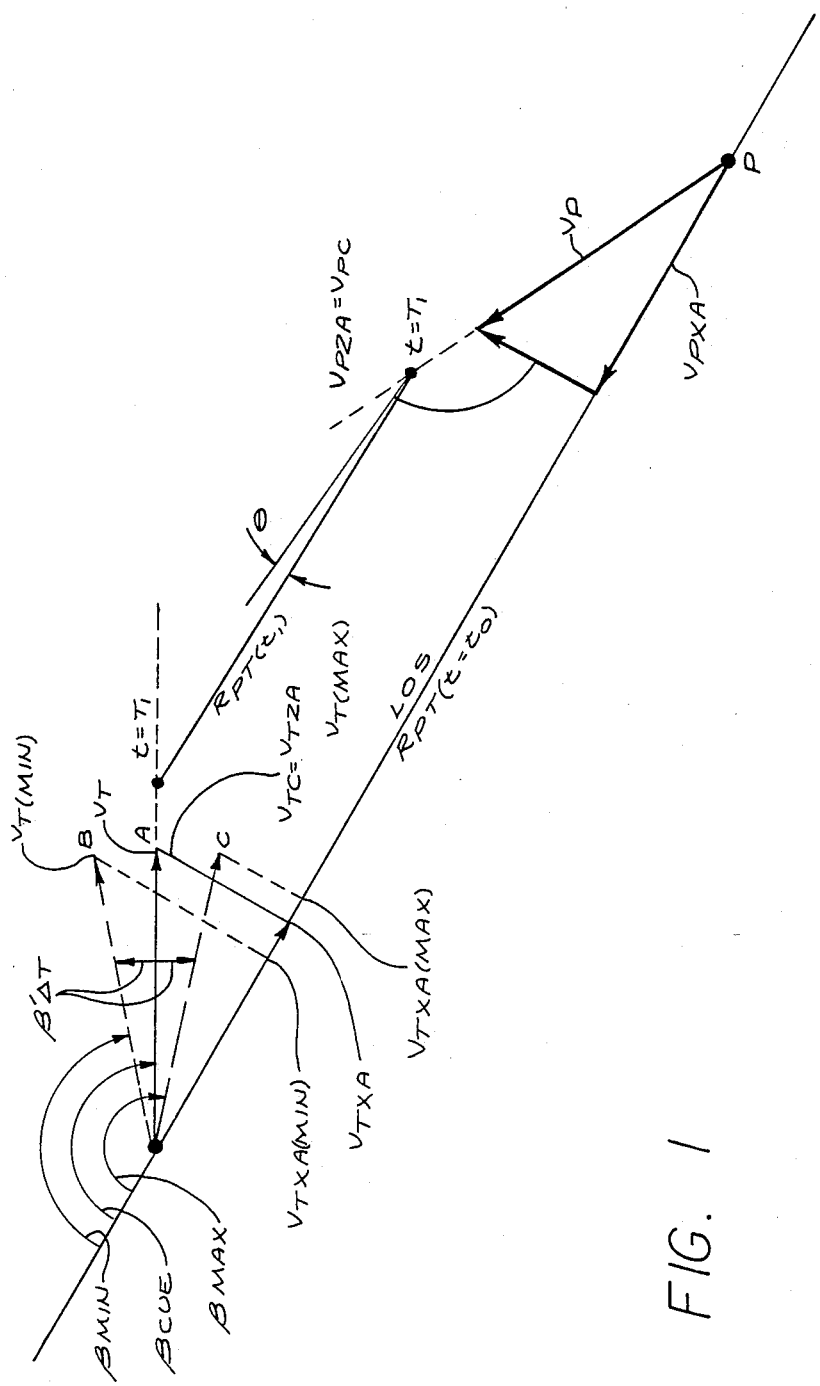
FIG. 1 is a vectorial representation of the position and movement of a target relative to a platform.

The present invention is a method and associated system for developing and maintaining a cue on an airborne target, i.e., target position and velocity in inertial space. The invention is based on the following assumptions: (1) that a complete set of target parameters, indicating target position and velocity in inertial space, is available as a minimum during some initial time period; (2) that the target scalar velocity is essentially constant throughout flight and that there are no significant longitudinal accelerations; (3) that the worst case target lateral acceleration (in quadrature to the instantaneous target velocity vector) is known over some period of time; (4) that the velocity and attitude parameters of the tracking platform are of known accuracy; (5) an estimate of the accuracy of all target measurement parameters is available; (6) the system tracking function maintains the antenna line-of-sight coincident with the line-of-sight from the platform to the target when angle measurements are available and extrapolates the position when measurements are not available; and (7) during any period in which no target data is available, the target performs a worst case maneuver with regard to uncertainty.

A key step in the method of the present invention is in the use of all available measurement data to estimate the target scalar velocity, $V_T$ and aspect angle $\beta_{cue}$ at the time of measurement. That is, in accordance with the teachings of the present invention, if the target velocity $V_T$ and the target aspect angle $\beta_{cue}$ are known, and there is a momentary loss of tracking data, then given that when the target accelerates, it changes aspect angle $\beta_{cue}$ (which is particularly true for airborne targets), $\beta_{cue}$ can be recalculated. And since the target scalar velocity $V_T$ is assumed to be constant, a new target cue may be provided with a minimal uncertainty zone.

The teachings of the present invention are provided below in three sections. First, it is disclosed how the target velocity $V_T$ and aspect angle $\beta_{cue}$ are calculated based on the above assumptions and a steady flow of tracking data. Next, the methodology for the determination of the position of the target is provided with respect to range rate and aspect angle estimates or bounds (minimums and maximums) using an "accelerating target model" and the assumption that the target makes a maximum (worst case) maneuver during a period of unavailability of tracking data. Finally, the range rate uncertainty due to inaccuracies in the measurement of target and platform range rates is determined and combined with the acceleration model range rate parameters to determine the overall range rate interval containing the target. The platform and target range rate uncertainty contributions are also integrated separately to determine range uncertainty and then combined with the accelerating target range parameters to determine the overall (global) range interval.

CALCULATION OF TARGET CUE WITH INPUT DATA

FIG. 1 is a vectorial representation of the position and movement of a non-maneuvering target at point T relative to a platform at point P. The inertial frame chosen for computation is aligned with the line-of-sight (LOS) between the platform and the target being the X axis, the Y axis being positive to the right (normal to the X axis and into the page), and the Z axis being normal to the X axis and positive up (ANTENNA frame) since the antenna is assumed to be tracking the designated target. $V_T$ is a vector representing the velocity of the target in antenna coordinates. It has an initial measured aspect angle of $\beta_{cue}$, a velocity component along the line-of-sight of $V_{TXA}$, and a cross velocity component normal to the line-of-sight of $V_{Tc}=V_{TZA}$. For clarity, the velocity component along the Y axis $V_{TYA}$ is omitted. The platform is located at point P with a velocity vector $V_P$ having a component of $V_{PXA}$ along the line-of-sight and a cross component of $V_{Pc}$ which is equal to the component along the Z axis $V_{PZA}$ Again, the velocity component along the Y axis $V_{PYA}$ is omitted for clarity. Hence, the non-maneuvering case of FIG. 1 illustrates the basic tracking geometry and prediction of range and angle parameters over some time interval when $V_{Pc} \neq V_{Tc}$.

The following equations define the target parameters in terms of platform measurement parameters:

$$V_{TXA} = R'_{PT} + V_{PXA} \quad [1]$$

$$V_{TYA} = R_{PT} * \theta'_{AZ} + V_{PYA} \quad [2]$$

$$V_{TZA} = R_{PT} * \theta'_{EL} + V_{PZA} \quad [3]$$

$$V_T = (V_{TXA}^2 + V_{TYA}^2 + V_{TZA}^2)^{\frac{1}{2}} \quad [4]$$

$$\beta_{cue} = \cos^{-1}(V_{Tx}/V_T) = \sin^{-1}[(V_{Ty}^2 + V_{Tz}^2)^{\frac{1}{2}}/V_T] \quad [5]$$

where $R_{PT}$ is the range between the target and the platform, $R'_{PT}$ is the range rate, $\theta'_{AZ}$ the azimuth component of the line-of-sight rate $\theta'$ and $\theta'_{EL}$ is the elevation component of same.

Figure 2:
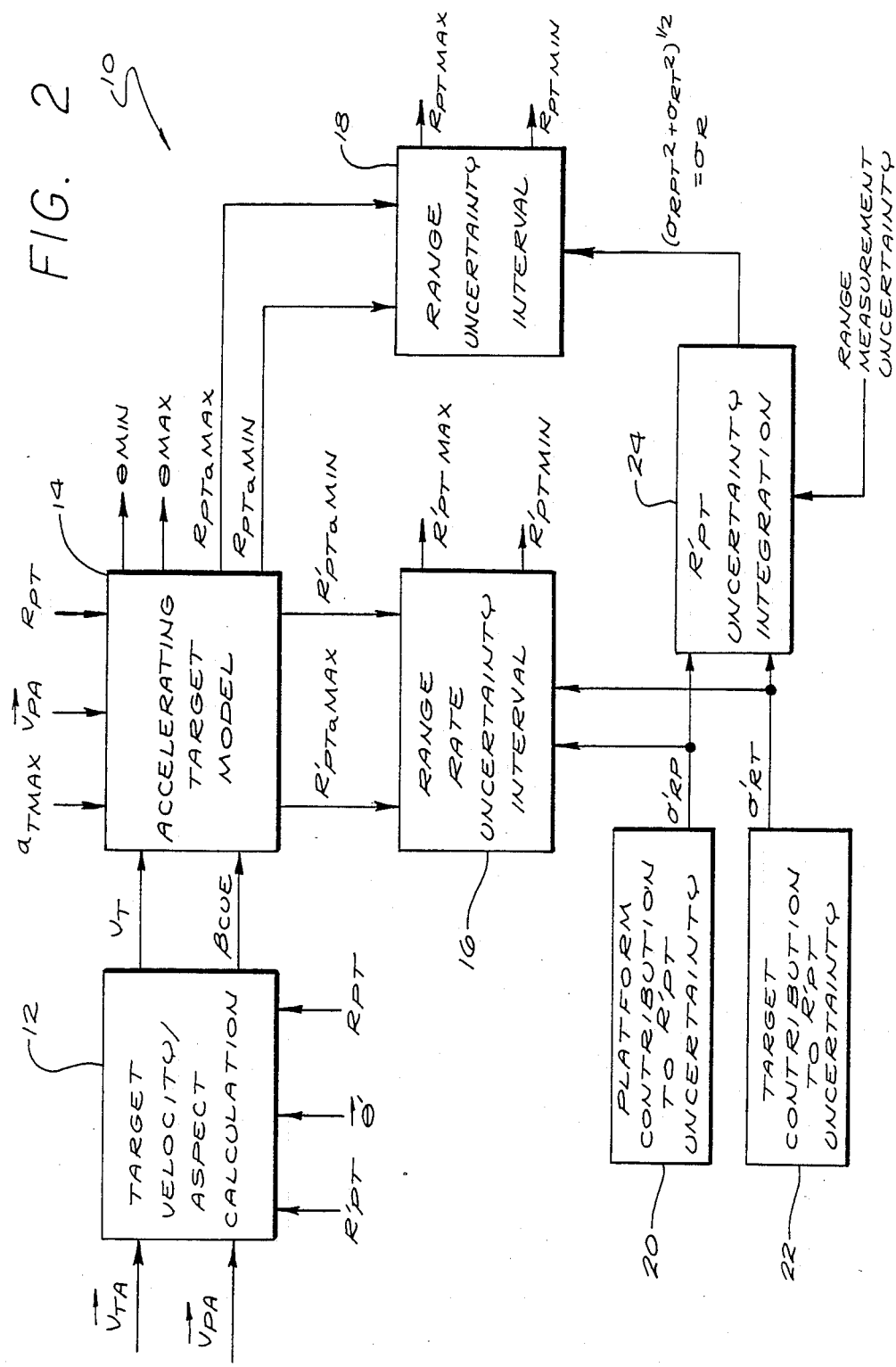
FIG. 2 shows a functional block diagram of the method of the present invention.

FIG. 2 shows a functional block diagram 10 of the method of the present invention. When target velocity data is available target velocity $V_T$ and aspect angle $\beta_{cue}$ may be calculated in accordance with equations 4 and 5 above. In the functional block diagram of FIG. 2, range $R_{PT}$, range rate $R'_{PT}$ and line-of-sight angular rate $\theta'$ are input along with target velocity $V_{TA}$ and platform velocity $V_{PA}$ to calculate target velocity $V_T$ and aspect angle $\beta_{cue}$ in inertial space.

Figure 3:
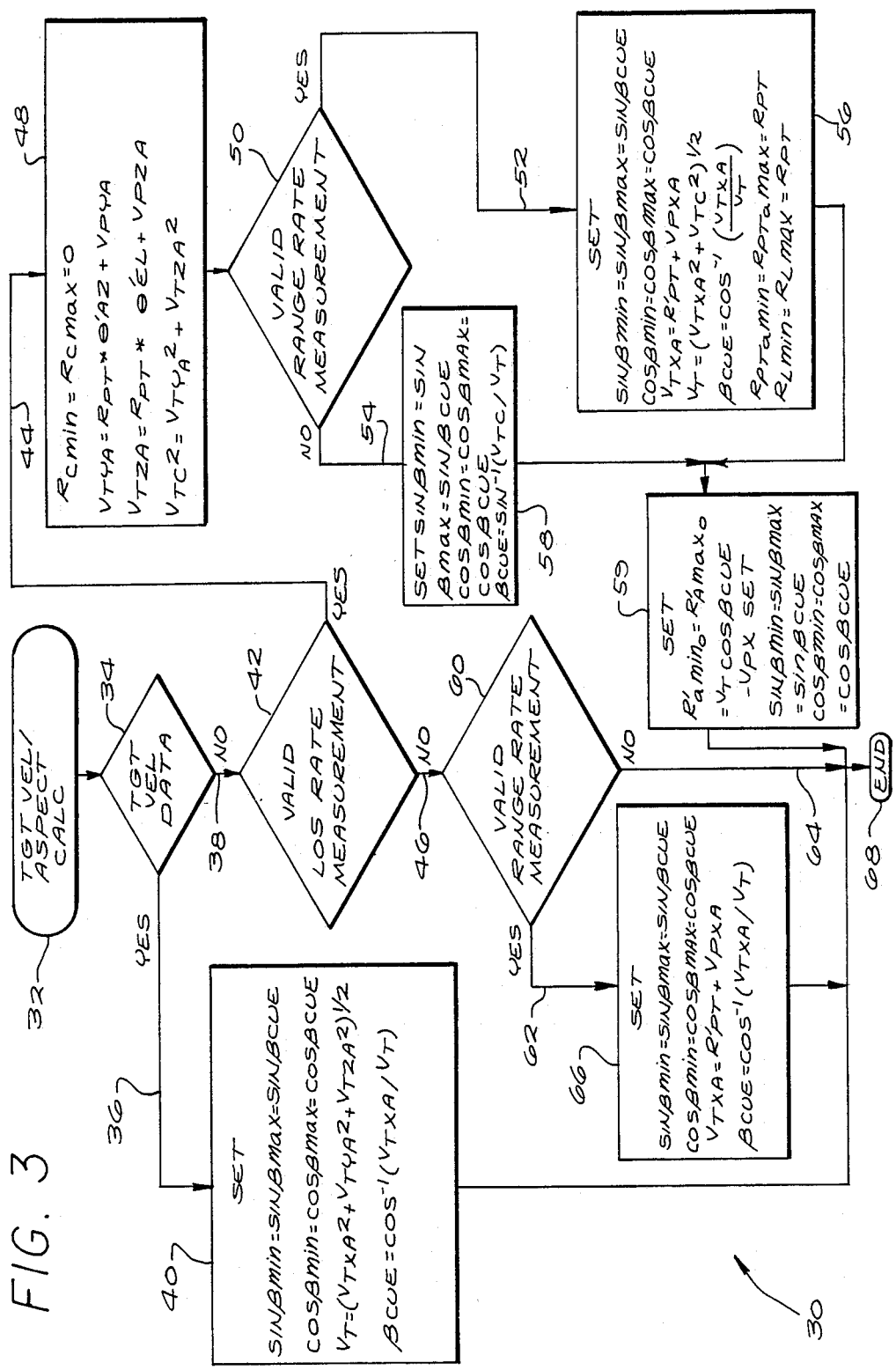
FIG. 3 is a flow chart illustrating the methodology of the present invention by which the target velocity and aspect are calculated.

FIG. 3 is a flow chart illustrating the methodology of the present invention by which the target velocity and aspect are calculated. As shown in the flow chart 30 of FIG. 3, the target velocity and aspect angle computations are performed at block 40 if some source of valid target velocity data is available. Given that the above measurement data was available at time T=0, the position of the target at time $T_1$ can be extrapolated in accordance with the following equation:

$$R_{PT}(T_1) = \{[R_{PT}(T_0) + R_{PTXA}'(T_1)(T_1 - T_0)]^2 + [(R_{PTcA}'(T_1)(T_1 - T_0)]^2\}^{\frac{1}{2}}$$

$$= \{R_L^2 + R_c^2\}^{\frac{1}{2}}$$

where $R_{PTXA}'(T_1)$ is the relative velocity along the x axis of the antenna, and $R_{PTcA}'(T_1)$ is the cross component of same. Similarly, the inertial rotation of the line-of-sight $\theta$ to the target at time $T_1$ relative to that at time $T_0$ is defined as follows:

$$\theta = \tan^{-1}(R_c/R_L)$$

In the absence of target maneuver, the radar tracking antenna will rotate at the line-of-sight rate such that the angle $\theta$ will be zero. (Thus, the angle $\theta$ represents the pointing error of the tracking system.) This then represents the general case. However, as it can not be assumed that the target will not maneuver during a period the data unavailability, the accelerating target model below extrapolates the last valid data assuming a worst case target maneuver.

THE ACCELERATING TARGET MODEL

The accelerating target model 14 of FIG. 2 serves to provide range, range rate and angle uncertainty bounds $R_{PTa(max)}$, $R_{PTa(min)}$, $R'_{PTa(max)}$, $R'_{PTa(min)}$, $\theta_{max}$ and $\theta_{min}$ respectively due to unknown target accelerations. The computations are performed given prior target velocity $V_T$ and aspect angle $\beta_{cue}$, a prior estimate of range $R_{PT}$, maximum target acceleration $A_{Tmax}$, and the platform velocity vector $V_{PA}$. Range and range rate estimates are provided by the midpoint of the range and range rate bounds. As shown below, range and range rate estimates yield target velocity and aspect angle estimates with smaller bounds than those afforded by prior techniques.

Referring again to FIG. 3, if tracking data flow is interrupted the present invention proceeds along the path 38 corresponding to 'no target velocity data' from the decision point 34. Next, the method of the present invention ascertains whether valid LOS rate measurement data $\theta'$ is available at decision point 42. If so, in branch 44, at 48, the invention calculates the azimuth and elevational components $\theta'_{AZ}$ and $\theta'_{EL}$ respectively of the LOS rate $\theta'$ from the target track. These values are then used with the range $R_{PT}$ and the platform velocity values to provide the target velocity components $V_{TYA}$ and $V_{TZA}$ in accordance with equations [2] and [3] above respectively. These values are then used to calculate $V_{Tc}$ in accordance with a modified equation [4] above, viz., $V_{Tc}^2 = V_{TYA}^2 + V_{TZA}^2$. At decision point 50, if valid range rate data $R'_{PT}$ is available, it is used to calculate X-axis component of the velocity vector $V_{TXA}$ using equation [1] above. The velocity vector $V_{TXA}$ is then combined with $V_{Tc}$ to provide a new target velocity estimate $V_T$. The new target velocity estimate $V_T$ is then used to compute $\beta_{cue}$ using equation [5]. If valid range rate measurement data at 50, then $\beta_{cue}$ is calculated based on the previous value of $V_T$.

Returning to decision point 42, if no LOS rate measurement data is available, then at point 60, the method of the present invention checks for valid range rate data. If valid range rate data is available, at step 66, it is used to calculate a new X-axis target velocity component, in accordance with equation [1]. This component is then used to calculate $\beta_{cue}$ in accordance with equation [5]. If no valid range rate data is available, the system extrapolates new velocity and aspect angle calculations based on previous values. In a tracking radar capable of multi-parameter target measurements, (range, range rate, angle), a certain precedence is implied. Angle measurements may be obtained to control the seeker line-of-sight and derive line-of-sight rate estimates for broadcasting targets; e.g., ECM sources; in the absence of range and/or range rate measurements. However, range and range rate measurements on the target are typically accompanied by angle data. Otherwise, it would be difficult to confirm that the source of the measurements is the desired target. In these systems, blocks 60 and 66 may consequently be eliminated from the flow chart of FIG. 3.

The target velocity and aspect angle values are used to provide range, range rate and pointing error outputs from the accelerating target model 14. These values are calculated as follows. First, it is noted that if the target accelerates, it changes its aspect angle $\beta$ generating an aspect angular rate $\beta'$ given by:

$$\beta' = A_{T(max)}/V_T \qquad [6]$$

where $A_T$ is the (lateral) acceleration of the target and $A_{T(max)}$ is the aircraft maneuver limit. This has the effect of changing the aspect angle of the target such that its velocity vector $V_T$ moves from point A to point B of FIG. 1 for maximum negative accelerations and to point C for maximum positive accelerations. At points B and C, the target velocity is represented by vectors $V_{T(min)}$ and $V_{T(max)}$ and the target has aspect angles of $\beta_{min}$ and $\beta_{max}$ respectively. Note that:

$$\beta_{min} = \beta_{cue} - \beta'*(\text{delta T}) \qquad [7]$$

$$\beta_{max} = \beta_{cue} + \beta'*(\text{delta T}) \qquad [8]$$

where $\beta'$ is the aspect rate and delta T is the relevant time interval. Since the polarity of the target acceleration is unknown, the range rate computations below are performed for both possible polarities of $\beta'*(\text{delta T})$, that is, both the minimum and the maximum target aspects.

Figure 4:
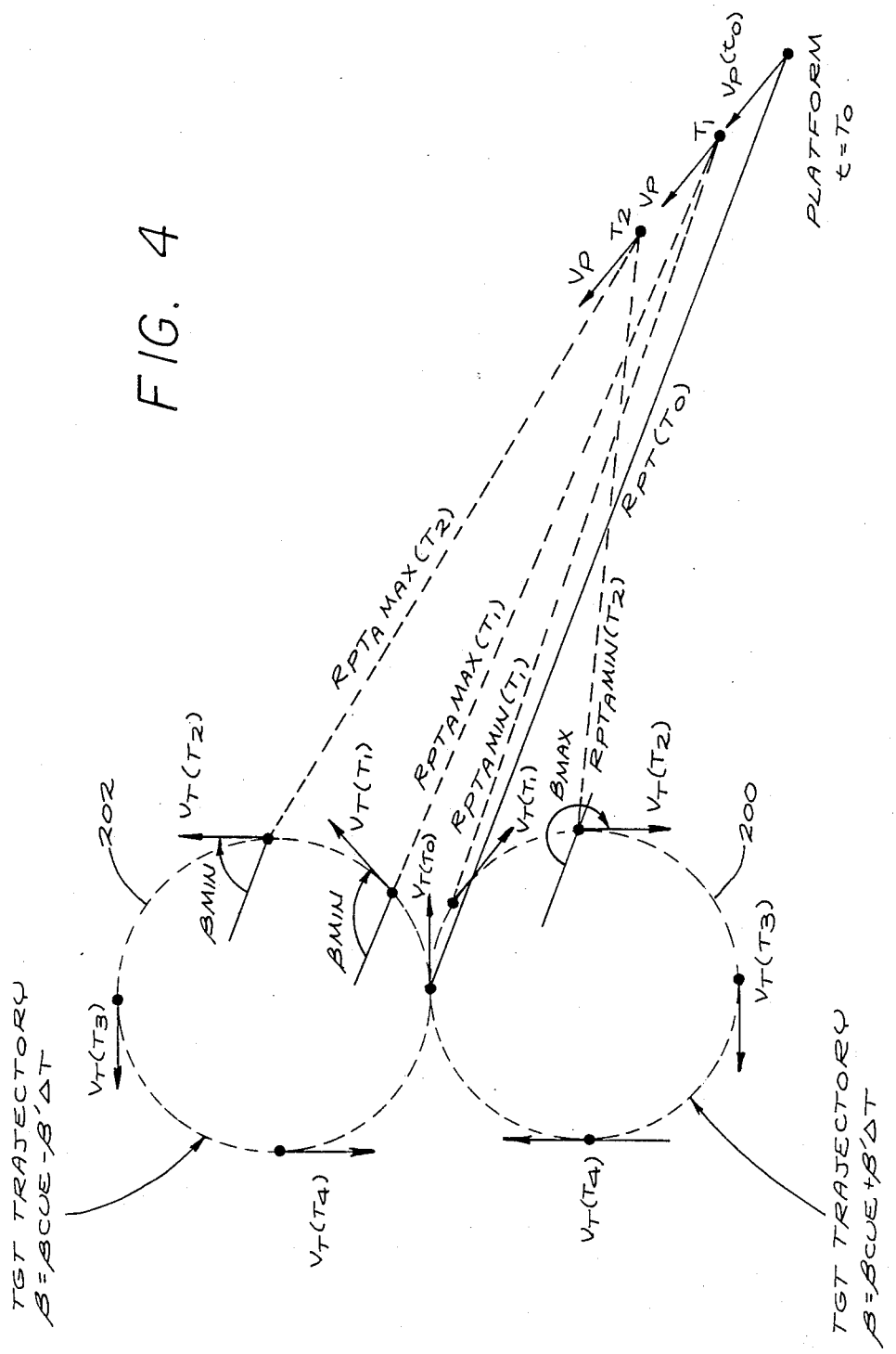
FIG. 4 is a vectorial representation of the position and movement of a target under constant acceleration relative to a platform.

The vectors $V_{T(min)}$ and $V_{T(max)}$ represent excursions from the initial aspect angle $\beta_{cue}$ of $\beta'*(\text{delta T})$ in the negative and positive directions $\beta_{min}$ and $\beta_{max}$ respectively. The vectors $V_{T(min)}$ and $V_{T(max)}$ represent the maximum possible excursions of the target during the period of data interruption. The vectors $V_{T(min)}$ and $V_{T(max)}$ have line-of-sight components of $V_{TXA(min)}$ and $V_{TXA(max)}$ respectively. FIG. 4 illustrates the track geometry under constant target acceleration conditions if the maneuver computaton is allowed to continue.

The range rate $R'_L$ along the line-of-sight is defined as the difference between the velocity components along the line-of-sight of the target $V_{TXA}$ and the platform $V_{PXA}$:

$$R'_L = V_{TXA} - V_{PXA} \qquad [9]$$

Substitution of the minimum and maximum values of the velocity components as provided above yields corresponding minimum and maximum values of the range rate along the line-of-sight $R'_L$. Integration of the range rate $R'_L$ over the range defined by these minimum and maximum values thereof and addition of an initial range position $R_o$ yields the minimum and maximum line-of-sight range values $R_{L(min)}$ and $R_{L(max)}$ respectively.

In FIG. 1 since the line-of-sight angular rate $\theta'$ is given by:

$$\theta' = (V_{Tc} - V_{pc})/R \qquad [10]$$

where R is the range, it can be seen that if the cross components $V_{Tc}$ and $V_{Pc}$ if the velocity vectors $V_T$ and $V_P$ respectively, are equal, the line-of-sight angular rate $\theta'$ is equal to 0 for $\beta = \beta_{cue}$. It is clear then that if the target accelerates laterally (changes aspect angle $\beta$), it is changing the value of the cross-component of velocity $V_{Tc}$. The present invention responds by developing a line-of-sight rate $\theta'$ in response to interruptions of data to estimate such target accelerations.

For this, it is necessary to know the value of the cross velocity term $V_{Tc}$ because as the target maneuvers, there is a change in angle rate $\theta'$ of the line-of-sight and a change in range rate along the line-of-sight. The range rate across the line-of-sight $R'_c$ may be approximated by equation 11 below:

$$R'_c = V_T[\sin \beta] - V_{Pc} \qquad [11]$$

where $V_T[\sin \beta]$ is an estimate of the target cross velocity term $V_{Tc}$. Substitution $\beta_{min}$ and $\beta_{max}$ for $\beta$ in equation [11] yields the range of target maneuverability. Thus, equations [9] and [11] provide range rates along the LOS and across the LOS respectively. Equations [12] and [13] below facilitate the calculation of the range R. The total range R is given by:

$$R = (R_c^2 + R_L^2)^{\frac{1}{2}} \qquad [12]$$

where $R_c = R_c + R'_c(\text{data T})$. Differentiating equation [12] yields:

$$R'_{i+1} = (R'_c R_{ci} + R'_L R_{Li})/R_i \qquad [13]$$

Which states that the new calculated range rate $R'_{i+1}$ is equal to the product of the range rate across the LOS $R'_c$ times the previous range calculation across the LOS $R_{ci}$ plus the range rate along the LOS $R'_L$ times the previous range calculation along the LOS $R_{Li}$ all divided by the total range calculated for the previous iteration. Thus, for these aspect angles, since $R'_c$ can be calculated as the midpoint in the range provided by using equation [11] for the assumed unknown target maneuver, and for the same maneuver, $R'_L$ can be calculated as the midpoint in the range provided by using equation [9], $R'_c$ can be accumulated or integrated to provide $R_c$ and $R'_L$ can be accumulated from the original R to provide $R_L$ and since the range R supplied at the outset provides a normalization factor to provide an initial range rate $R_i$, the total range R may be acquired by integrating equation [13]. (The total range thus acquired accounts for the down range (LOS) and cross range components.) Use of the minimum range rate value provides the minimum range while the maximum range value provides the maximum range.

Bounding the Aspect

Figure 5:
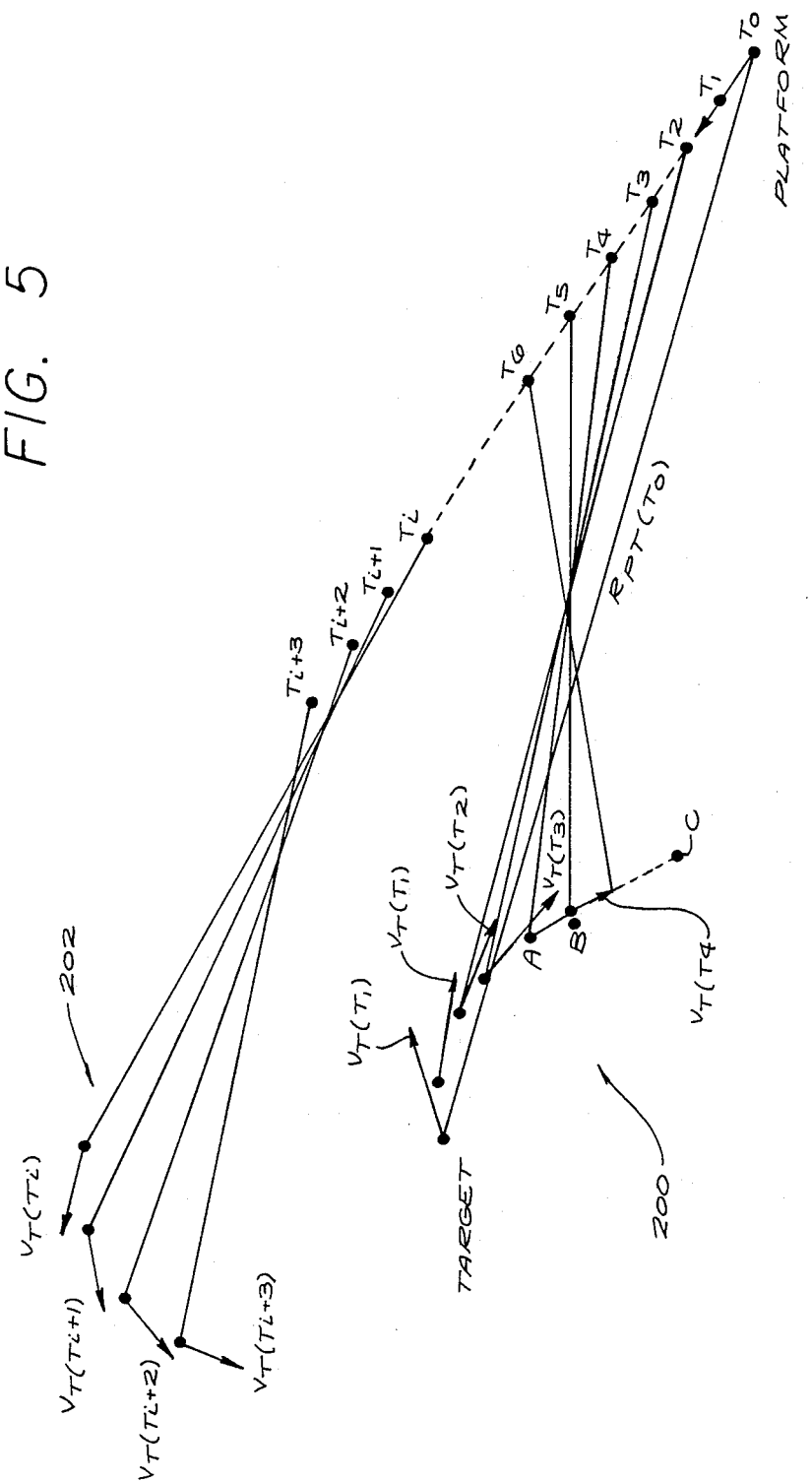
FIG. 5 shows target trajectories for minimum and maximum range predictions (target acceleration effects).
Figure 6A:
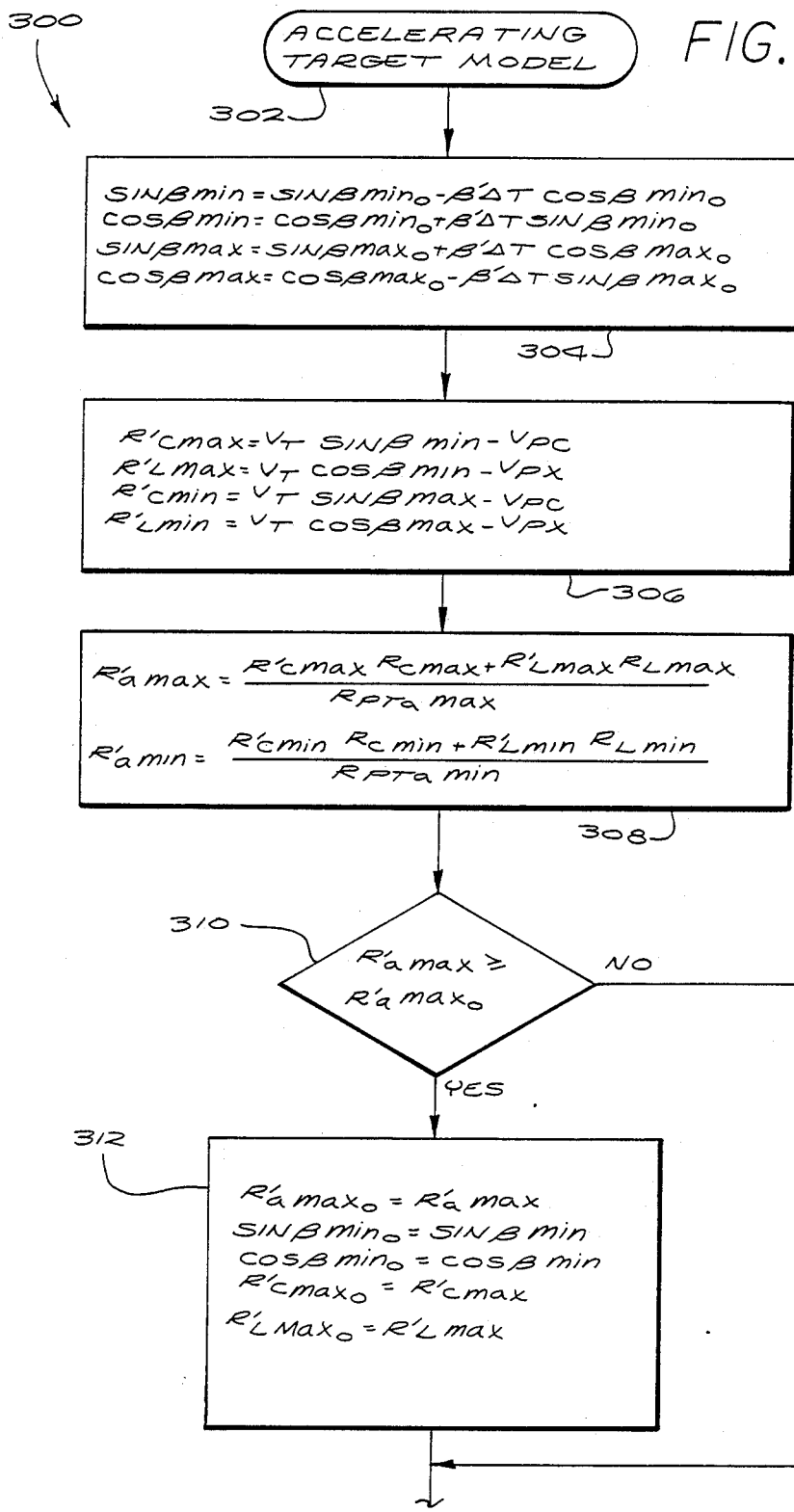
FIGS. 6(a) and 6(b) provide a flow chart of the methodology of the accelerating target model of the present invention, with aspect limiting, for the iterative calculation of range and range rate parameters.
Figure 6B:
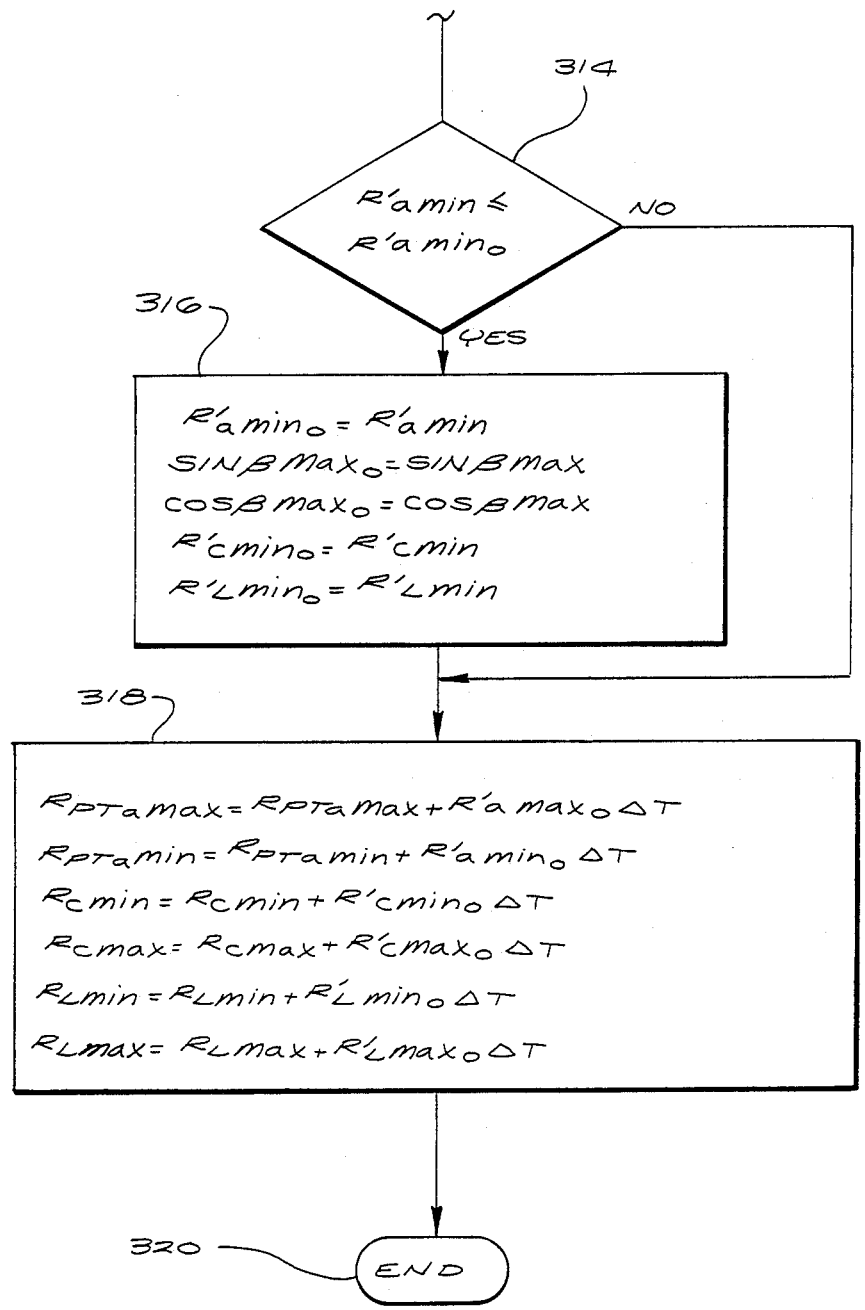

If the extrapolation time interval is allowed to increase arbitrarily, the values of the R' parameters, will be oscillatory due to the periodic nature of the individual components. This is illustrated in FIG. 4 which shows exemplary track geometries under constant target acceleration. A target which is assumed to maintain a positive lateral acceleration will have an oscillatory trajectory 200 similar to that shown below the LOS, while a target which is assumed to maintain a negative lateral acceleration will have an oscillatory trajectory 202 similar to that shown above the LOS. Obviously, this can create considerable ambiguity with respect to the target position and trajectory. The method of the present invention for resolving this ambiguity is to propagate $\beta'^*$(delta T), letting it grow until the slope of R' changes. This is illustrated in FIG. 5. For example, the aspect rotation for minimum range is stopped at point A, the projected minimum range under continued acceleration is shown at point B and the actual projected minimum range trajectory is shown at point C. Similarly corresponding points are noted for the assumption of continuous positive lateral acceleration resulting in the second trajeotory 202. Logic would be provided to terminate the maneuver whenever the slope of the range rate parameters change. This could easily be implemented by one of ordinary skill in the art. FIG. 6, for example, shows a flow chart 300 of an illustrative routine by which iterative calculations of the range and range rate parameters are performed to determine the assumed maneuver acceleration termination (aspect rotation limiting) point by the accelerating target model 14. The aspect rotation limiting feature of the present invention is illustrated for minimum and maximum range in a geometric sense although the actual limiting is based on the range rate parameters; i.e., minimum range rate propagates to minimum range and maximum range rate propagates to maximum range. By this procedure, the absolute minimum and maximum values of range rate for a target initiating an unknown maneuver at t=0 are calculated, and the integration of these range rates provides minimum and maximum values of range. The accumulated values of $\beta'^*$(delta T) are then used in accordance with equation [7] and [8] above to provide $\beta_{min}$ and $\beta_{max}$. (Separate criteria for $\beta_{min}$ and $\beta_{max}$.)

Figure 7A:
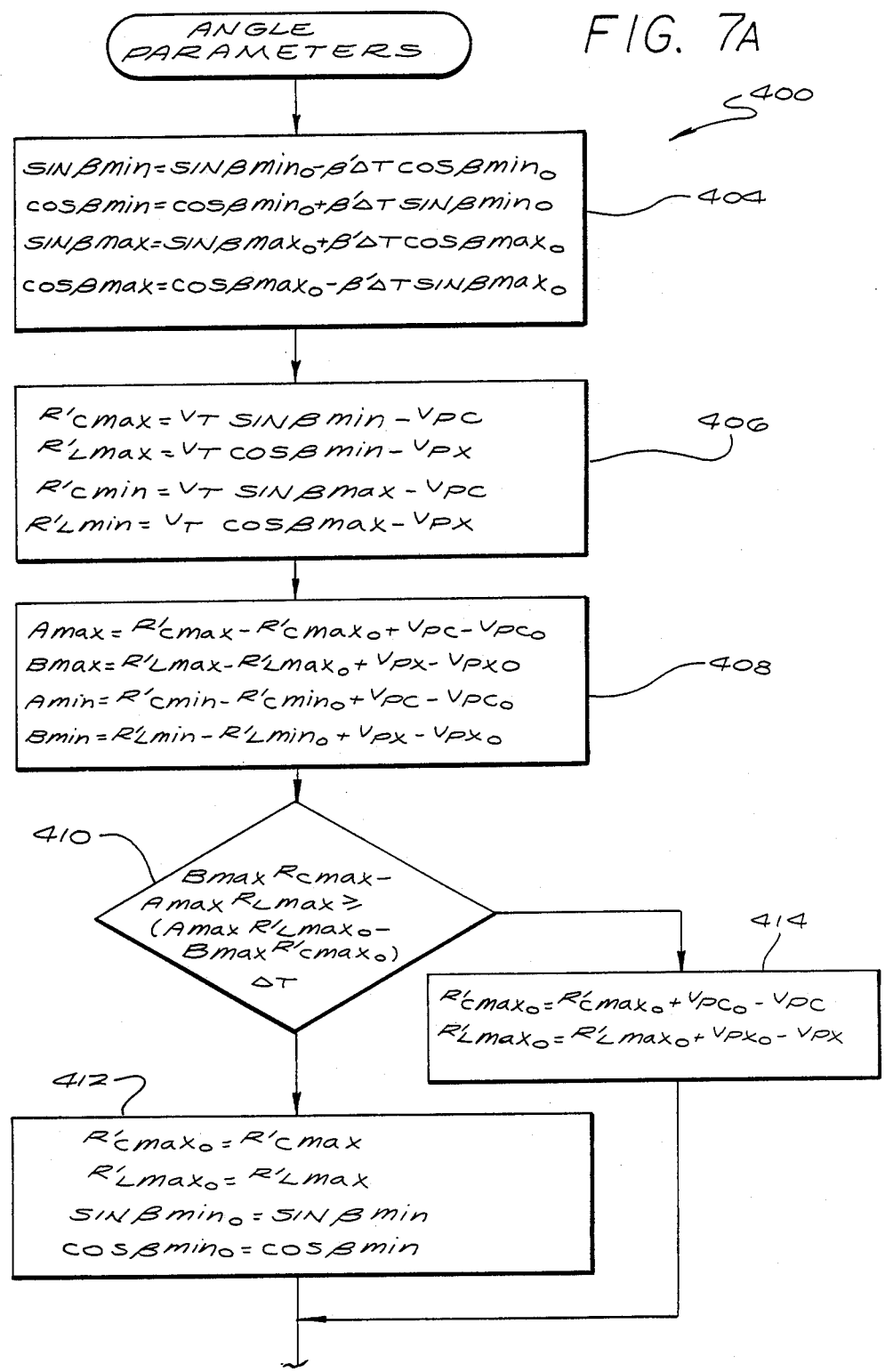
FIGS. 7(a) and 7(b) provide a flow chart of the methodology of the accelerating target model of the present invention for calculating angle parameters, with aspect limiting.
Figure 7B:
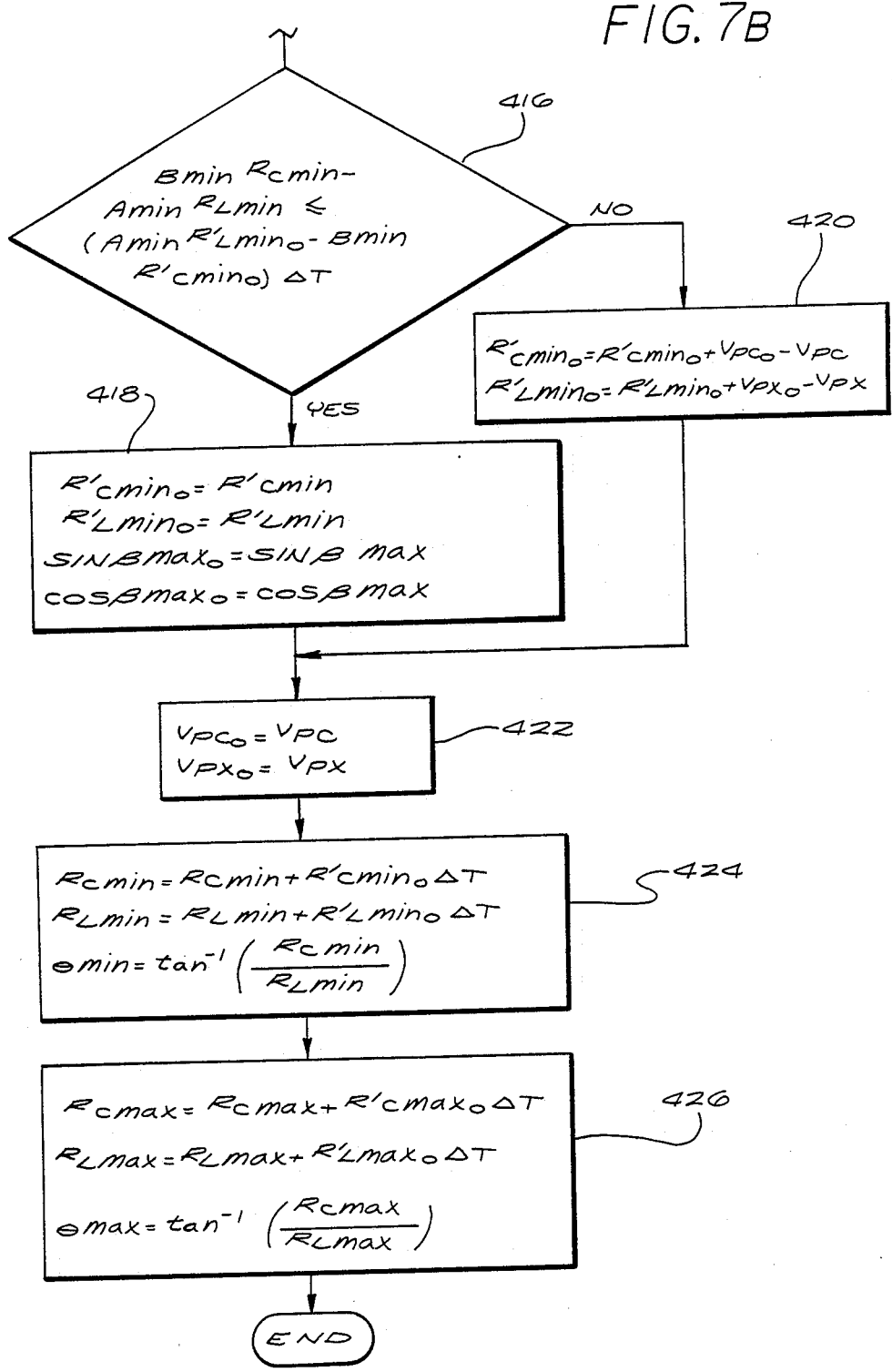

A similar procedure is performed for the target pointing error values, insofar as the aspect calculation is concerned. The LOS angle error $\theta$ due to target maneuver is simply:

$$\theta = \tan^{-1}(R_C/R_L) \qquad [14]$$

where $R_C$ and $R_L$ are provided above. This calculation is performed with continuous aspect rate until the value is maximized, at which time the maneuver is terminated. FIG. 7, shows a flow chart 400 of an illustrative routine by which the LOS angle error $\theta$ limits are calculated for the assumed maneuvering target including lateral acceleration termination (aspect rotation limiting) by the accelerating target model 14. The values of $\theta_{min}$ and $\theta_{max}$ are given as follows.

$$\theta_{min} = \tan^{-1}(R_{c(min)}/R_{L(min)})$$

and $$\theta_{max} = \tan^{-1}(R_{c(max)}/R_{L(max)})$$

The values of $\beta_{min}$ and $\beta_{max}$ are set to $\beta_{cue}$ whenever $\beta_{cue}$ is calculated regardless of the type of measurement used in the calculation. At this time, the minimum and maximum values of R' are also equal since the $\beta_{cue}$ calculation is an estimate of the integral of the unknown target maneuver. However, since the actual target maneuver history is unknown, the range estimate is only updated when a range measurement is input. For this condition, the values of $R_{PTA(min)}$ and $R_{PTA(max)}$ are set to the measurement value.

Thus, range, range rate and pointing error and aspect angle bounds for worst case target maneuver are provided.

RANGE AND RANGE RATE UNCERTAINTY CALCULATIONS

The above calculations presume that the measurement data is perfect. The present invention provides a technique for incorporating uncertainties due to inaccuracies in the measured parameters.

In the absence of measurements of range and range rate parameters, separate calculations are performed to determine the target contribution to range rate uncertainty and the platform contribution to range rate uncertainty. These parameters are combined with the acceleration model range rate parameters to determine the overall range rate interval containing the designated target. The platform and target contributions are also integrated separately to determine range uncertainty and then combined with the accelerating target range parameters to determine the overall range interval. See the associated blocks 20, 22 and 24 of the functional block diagram of FIG. 2. The platform and target contributions to range rate uncertainty $\sigma_{RP}$, and $\sigma_{RT}$, are combined with the accelerating target range rate bounds $R'_{PTa(max)}$ and $R'_{PTa(min)}$ output from the accelerating target model to update the range rate uncertainty interval between $R'_{PT(max)}$ and $R'_{PT(min)}$. (See block 16 of FIG. 2.) In addition, the platform and target contributions to range rate uncertainty $\sigma'_{RP}$ and $\sigma'_{RT}$ are integrated, squared summed and square rooted at block 24 to provide the target range uncertainty:

$$\sigma_{RPT} = (\sigma_{RP}^2 + \sigma_{RT}^2)^{1/2} \qquad [15]$$

The range uncertainty $\sigma_R$ is combined with the accelerating target model range bounds $R_{PTa(max)}$ and $R_{PTa(min)}$ at block 18 to provide the range uncertainty interval $R_{PT(min)}$ and $R_{PT(max)}$. The average of these values $R_{PT(min)}$ and $R_{PT(max)}$ provides the best estimate of range $R_{PT}$.

Figure 8:
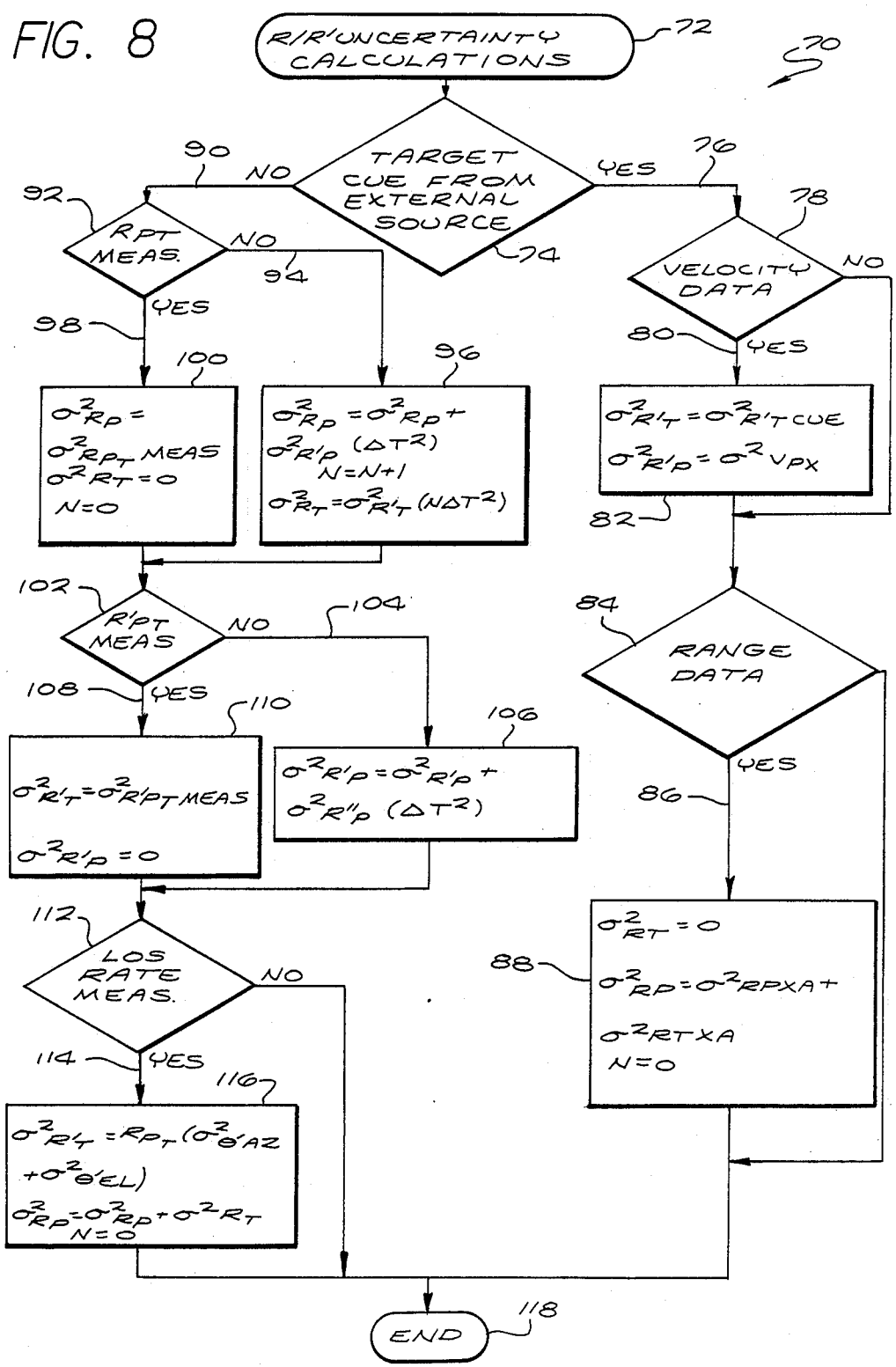
FIG. 8 is a flow chart of the method for controlling the range and range rate uncertainty inputs and the integrations thereof for each type of measurement of the present invention.

The method for controlling (resetting) the range rate uncertainty inputs and the integrations thereof for each type of measurement is provided in the flow chart 70 of FIG. 8. To the extent that valid data is available either from an external source along path 76 or from platform measurements via path 90, it is used to minimize uncertainty. That is, if live data is available, the uncertainty parameters are set in accordance with the validity of the live data. Thus, at decision point 78, when target velocity data is provided with an indication of its uncertainty, the target component of range rate uncertainty is set to the uncertainty in the derived target component along the line-of-sight. The platform component is set to the uncertainty in platform velocity along the line-of-sight (see block 82). Similarly, if at decision point 84 target inertial position data is provided, the target component of range error is set to zero and the platform component of range uncertainty is set to the combination of the uncertainty in the target position along the line-of-sight and the uncertainty in the platform position along the line-of-sight (see block 88). The values of $\sigma^2_{RT}$ and $\sigma^2_{R'T}$ are a priori uncertainty estimates of the target parameters which may only be modified by subsequent external or live measurement data.

If no fresh data from any source is available, the a priori estimate of the target component of range rate error $\sigma^2_{R'T}$ is propagated for the entire interval since the last valid range measurement to determine the target component of range error in block 96 via path 94. The platform component of range error is determined by integrating the platform range rate uncertainty over the interval since the last live data with an initial condition equal to its uncertainty at the time of the live data. The platform range rate uncertainty is calculated by integrating the platform acceleration uncertainty over the interval of no measurements with an initial condition equal to the platform range rate uncertainty at the time of the last live data in block 106 via path 104. In these calculations, delta T is the iteration time interval and N*(delta T) is the total interval since the last live data input.

When a live range measurement is available, the range uncertainty parameters are set in accordance with the data validity in block 100 via path 98. The entire uncertainty in range is assigned to the platform parameter $\sigma^2_{RP}$ for computation convenience; and the target component $\sigma^2_{RT}$ and the interval parameter N are set to zero. When live range rate data is available via path 108 from decision point 102, the range rate uncertainty parameters are reset in accordance with data validity. For computational convenience, the platform component is set to zero and the entire measurement uncertainty is assigned to the target parameter, $\sigma^2_{R'T}$.

When valid line-of-sight rate data is available at decision point 112, the range and range rate uncertainty parameters are adjusted in accordance with the use of this data in the computation of target aspect (block 12 of FIG. 2). The error in the range rate component derived from line-of-sight rate data is determined in block 116 and assigned to the target component. Since line-of-sight rate data may be derived when range and range rate measurements are not available, its use in determining the instantaneous target range rate component does not allow reset of the platform components of range and range rate uncertainties. Further, the target component of range error due to a priori target range rate uncertainty in the interval between measurements can not be eliminated by knowing the current target aspect since the target trajectory is unknown. Therefore, the target component of range uncertainty is added to the platform component and the measurement interval parameter is set to zero.

Thus, in accordance with equation [15] above, $\sigma_{RPT}$ is provided to the range uncertainty interval calculation routine 18 which computes the global minimum and maximum range:

$$R_{PT(min)} = R_{PTa(min)} - K * \sigma_{RPT} \quad [16]$$

$$R_{PT(max)} = R_{PTa(max)} + K * \sigma_{RPT} \quad [17]$$

where the minimum and maximum platform to target range parameters for the 'no data' case are provided by the accelerating model routine 14 and K is a scalar relating to the desired level of certainty in terms of the number of standard deviations $\sigma$ used in the calculation (normally three).

Note that the platform errors in cross velocity and cross range components (the integral of cross velocity) are negligible in comparison to the corresponding target maneuver induced components and are therefore ignored in the computations of FIG. 8. It should also be noted that the flow chart of FIG. 8 is merely illustrative of the manner in which the computations may be performed to account for measurement error. Any specific implementation would depend on the system in which it is embedded.

The present invention has been described herein with reference to a particular embodiment for an illustrative application. Those of ordinary skill in the art will appreciate additional modifications, applications and embodiments within the scope thereof. It is intended by the appended claims to cover any and all such applications modifications and embodiments.

Accordingly,

What is claimed is:

1. A method for determining the position and velocity of a target in inertial space including the steps of:
   (a) Tracking the target and providing three orthogonal velocity components in inertial space;
   (b) computing the scalar velocity $V_T$ of the target in an inertial reference frame by providing the square root of the sum of the squares of the orthogonal velocity components;
   (c) computing the aspect angle cue of the target relative to a line-of-sight to a platform as an inverse sinusoidal function of the ratio of one of said orthogonal components and $V_T$, when such tracking data is available, and otherwise;
   (d) estimating actual target maneuver to develop a minimum uncertainty zone using an assumed worst case lateral target acceleration; and
   (e) aiming an antenna at said determined positioned of said target.

2. The method of claim 1 wherein said step of computing the aspect angle of the target $\beta_{cue}$ includes the step of computing an aspect angle $\beta_{cue}$ which is equal to the arccos of the ratio of a velocity component of the target along said line-of-sight $V_{TXA}$ to the scalar velocity of the target $V_T$.

3. The method of claim 1 wherein said step of estimating the actual target maneuver when tracking data in not available includes the steps of:
   (e) obtaining a measure of the range rate of the target relative to said platform $R'_{PT}$;
   (f) computing a new velocity component of the target along said line-of-sight $V_{TXA}$ by adding said range rate $R'_{PT}$ to a velocity of said platform along said line-of-sight sight $V_{PXA}$; and (g) computing a new aspect angle by the target $\beta_{cue}$ equal to the arccos of the ratio of the new velocity component of the target along said line-of-sight $V_{TXA}$ to the scalar velocity of the target $V_T$.

4. The method of claim 1 wherein said step of estimating the actual target maneuver when tracking data is not available includes the steps of:

(e) obtaining a measure of the rate of change of the angle between the line-of-sight between the platform and the target $\theta'$ and providing the azimuthal $\theta'_{AZ}$ and elevational components $\theta'_{EL}$ thereof;

(f) computing a new velocity component of said target along a Y axis $V_{TYA}$ by multiplying an estimate of the range $R_{PT}$ along the line-of-sight between the platform and the target by the azimuthal component $\theta'_{AZ}$ of the angle rate between the line-of-sight between the platform and the target and adding thereto any velocity of the platform in along said Y axis $V_{PYA}$;

(g) computing a new velocity component of said target along a Z axis $V_{TZA}$ by multiplying an estimate of the range $R_{PT}$ along the line-of-sight between the platform and the target by the elevational component $\theta'_{EL}$ of the angle rate between the line-of-sight between the platform and the target and adding thereto any velocity of the platform in along said Z axis $V_{PZA}$; and (h) computing a cross velocity of the target $V_{Tc}$ by taking the square root of the sum of the squares of said new velocity components along said Y and Z axes $V_{TYA}$ and $V_{TZA}$ respectively.

5. The method of claim 4 wherein said step of estimating the actual target maneuver when tracking data in not available includes the step of calculating a new aspect angle $\beta_{cue}$ equal to the arcsin of the ratio of the cross velocity of said target $V_{Tc}$ to the scalar velocity of said target $V_T$.

6. The method of claim 4 wherein said step of estimating the actual target maneuver when tracking data in not available includes the steps of:

(i) obtaining a measure of the range rate $R'$ of the target relative to the platform along the line-of-sight;

(j) computing a new velocity component of the target along the line-of-sight $V_{TXA}$ by adding the range rate $R'_{PT}$ to any velocity of the platform along the line-ofsight sight $V_{PXA}$;

(k) computing a new scalar velocity $V_T$ by taking the square root of the sum of the squares of the new velocity component of the target along the line-of-sight $V_{TXA}$ and the cross velocity of the target $V_{Tc}$; and (l) computing a new aspect angle $\beta_{cue}$ equal to the arccos of the ratio of the new velocity component of the target along the line-of-sight $V_{TXA}$ to the new scalar velocity of said target $V_T$.

7. The method of claim 1 including the step of bounding the aspect angle by setting the minimum and maximum range rates of the target at to the angles at which the range rate changes slope.

8. The method of claim 7 including the step of bounding the aspect angle by setting the minimum and maximum range of the target relative to the platform by integrating said minimum and maximum range rates.

9. The method of claim 1 including the step of bounding the aspect angle by minimizing the pointing error $\theta$ of the line-of-sight from the platform to the target equal to the arctan of the ratio of any cross range $R_C$ of the target to the range of the target along the line-of-sight $R_L$.

10. A system for determining the position and velocity components in inertial space;

means for tracking the target and providing three orthogonal velocity components in inertial space;

means for computing the scalar velocity $V_T$ of the target in an inertial reference frame by providing the square root of the sum of the squares of the orthogonal velocity components;

means for computing the aspect angle cue of the target relative to a line-of-sight to a platform as an inverse sinusoidal function of the ratio of one of said orthogonal components and $V_T$, when such tracking data is available, and;

means for estimating actual target maneuver to develop a minimum uncertainty zone using an assumed worst case lateral target acceleration when such tracking data is not available: and means for aiming an antenna at said determined position.

* * * * *